United States Patent
Iyasu et al.

(10) Patent No.: US 10,432,100 B2
(45) Date of Patent: Oct. 1, 2019

(54) ELECTRIC POWER CONVERSION DEVICE

(71) Applicant: DENSO CORPORATION, Kariya, Aichi-pref. (JP)

(72) Inventors: Seiji Iyasu, Nisshin (JP); Yuji Hayashi, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/053,108

(22) Filed: Aug. 2, 2018

(65) Prior Publication Data

US 2019/0068070 A1 Feb. 28, 2019

(30) Foreign Application Priority Data

Aug. 30, 2017 (JP) .................. 2017-165947

(51) Int. Cl.
  *H02M 3/335* (2006.01)
  *H02M 1/088* (2006.01)
  *H02M 1/36* (2007.01)
  *H02M 3/337* (2006.01)
  *H02M 1/00* (2006.01)

(52) U.S. Cl.
  CPC ....... *H02M 3/33576* (2013.01); *H02M 1/088* (2013.01); *H02M 1/36* (2013.01); *H02M 3/3376* (2013.01); *H02M 3/33584* (2013.01); *H02M 2001/0009* (2013.01)

(58) Field of Classification Search
  CPC ............. H02M 3/005; H02M 3/33507; H02M 3/33523; H02M 3/33569; H02M 3/33576; H02M 3/33584; H02M 3/33595; H02M 1/32–36; H02M 1/88; H01F 38/02
  USPC ..... 363/16, 17, 21.01, 21.06, 24–26, 97, 98, 363/131, 132, 134
  See application file for complete search history.

(56) References Cited

U.S. PATENT DOCUMENTS

| | | | | |
|---|---|---|---|---|
| 2,946,014 A | * | 7/1960 | Byles ................. | H03F 5/00 330/3 |
| 3,315,102 A | * | 4/1967 | Quint ................. | B06B 1/0276 310/317 |
| 4,675,796 A | * | 6/1987 | Gautherin ........... | H01F 38/02 363/134 |

(Continued)

FOREIGN PATENT DOCUMENTS

| | | |
|---|---|---|
| JP | 2015-228788 A | 12/2015 |
| JP | 2016-192889 A | 11/2016 |

*Primary Examiner* — Yemane Mehari
(74) *Attorney, Agent, or Firm* — Oliff PLC

(57) ABSTRACT

An electric power conversion device supplies electric power of a DC power source from an input part to an output part through a power conversion circuit having a transformer and switches. The transformer has primary and secondary coils magnetically connected. The device has a choke coil, an auxiliary coil and a control part. The auxiliary coil is connected to the output part and magnetically connected to the choke coil. The auxiliary coil is wound to allow a current to flow from a negative-electrode side to a positive-electrode side of the output part when a current flows from the power source to the choke coil. The control part performs a switching control of the switches to supply electric power of the source to the output part through the auxiliary coil to prevent generation of magnetic flux in the primary coil and the current from flowing in the secondary coil.

9 Claims, 15 Drawing Sheets

(56) References Cited

U.S. PATENT DOCUMENTS

| | | | | |
|---|---|---|---|---|
| 5,381,327 A * | 1/1995 | Yan | ............... | H02M 3/33576 |
| | | | | 363/24 |
| 5,451,750 A * | 9/1995 | An | ............... | H02M 7/53846 |
| | | | | 219/716 |
| 5,502,628 A * | 3/1996 | Arakawa | ............ | H02M 1/4208 |
| | | | | 323/207 |
| 6,567,285 B2 * | 5/2003 | Cho | ............... | H02M 3/3376 |
| | | | | 363/132 |
| 7,242,595 B2 * | 7/2007 | Yasumura | ......... | H02M 3/33507 |
| | | | | 363/21.02 |
| 2017/0033696 A1 * | 2/2017 | Handa | ............ | H02M 3/33584 |

* cited by examiner

D MODE

E11 MODE

ELECTRIC POWER CONVERSION DEVICE

CROSS-REFERENCE TO RELATED APPLICATION

This application is related to and claims priority from Japanese Patent Application No. 2017-165947 filed on Aug. 30, 2017, the contents of which are hereby incorporated by reference.

BACKGROUND OF THE INVENTION

1. Field of the Invention

The present invention relates to electric power conversion devices capable of supplying electric power from an input part connected to a direct current power source to an output part through an electric power conversion circuit equipped with switches and a transformer having a primary coil and a secondary coil magnetically connected together.

2. Description of the Related Art

For example, patent document 1, Japanese patent laid open publication No. 2017-34982 discloses a power conversion device having a known structure in which a choke coil, an auxiliary coil, and a rectifier element are arranged between a direct current power source and an electric power conversion circuit. The auxiliary coil is magnetically connected to the choke coil. The auxiliary coil and the choke coil act as a fly back transformer. The auxiliary coil is wound and connected to an output part of the power conversion device so as to provide a current from a negative electrode side of the output part to a positive electrode side of the output part when the current flows to the choke coil.

The rectifier element and the auxiliary coil are connected in series. The rectifier element prohibits the supply of electric power from the direct current power source to the output part through the choke coil and the auxiliary coil when the switching elements generate a closed circuit including the direct current power source and the choke coil. The auxiliary coil prohibits the supply of electric power from the output part to the input part.

The electric power conversion device according to the conventional structure previously described performs the supply of electric power from the input part to the output part through the transformer having the primary coil and the secondary coil, and the supply of electric power from the input part to the output part through the choke coil and the auxiliary coil.

There is a possible situation in which it is preferable to avoid the supply of electric power from the input part to the output part through the transformer in the electric power conversion device. This situation may occur because the choke coil is not correctly excited or magnetized in the electric power conversion device.

SUMMARY

It is therefore desired to provide an electric power conversion device capable of correctly performing supply of electric power of a direct current power source from an input part to an output part when there occurs a situation in which it is preferable to avoid the supply of electric power to the output part through a transformer in the electric power conversion device.

In accordance with one aspect of the present invention, there is provided an electric power conversion device having an input part, a choke coil, an electric power conversion circuit, an auxiliary coil, an output part, a rectifier element and a control part. The input part is connected to a direct current power source. The input part has a positive electrode side terminal and a negative electrode side terminal. The choke coil is connected to the input part. The electric power conversion circuit is connected to the input part through the choke coil. The electric power conversion circuit has a transformer and switches. The transformer has a primary coil and a secondary coil which are magnetically connected together. The output part is connected to the electric power conversion circuit. The output part has a positive electrode side terminal and a negative electrode side terminal. The auxiliary coil is connected to the output part and magnetically connected to the choke coil. The auxiliary coil is wound in order to allow a current to flow from the negative electrode side terminal of the output part choke coil to the positive electrode side terminal of the output part choke coil when a current flows from the direct current power source to the choke coil. The rectifier element is connected in series with the auxiliary coil. The rectifier element prohibits supply of electric power from the direct current power source to the output part through the choke coil and the auxiliary coil. The rectifier element prohibits supply of electric power from the output part to the input part, when a closed circuit including the direct current power source and the choke coil by a switching control of the switches. The control part performs the switching control of the switches so as to prevent a magnetic flux from being generated in the primary coil, and to prohibit a current from flowing in the secondary coil. The control part performs the supply of electric power from the direct current power source to the output part through the choke coil and the auxiliary coil.

In the electric power conversion device according to the present invention, the control part performs the switching control process of the switches so as to prevent magnetic flux from being generated in the primary coil, and to prevent a current from flowing in the secondary coil. This switching control makes it possible to prevent the execution of the electric power transmission through the transformer, and to prevent the use of the electric power supply path from the direct current power source and the input part to the output part. Accordingly, it is possible for the electric power conversion device according to the present invention to supply the electric power of the direct current power source from the input part to the output part through the specific electric power supply path. In more detail, the specific electric power supply path is composed of the choke coil and the auxiliary coil. That is, the electric power conversion device according to the present invention supplies the electric power of the direct current power source from the input part to the output part through the specific electric power supply path when there happens a case in which it is preferable to avoid the supply of electric power to the output part through the transformer in the electric power conversion device.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
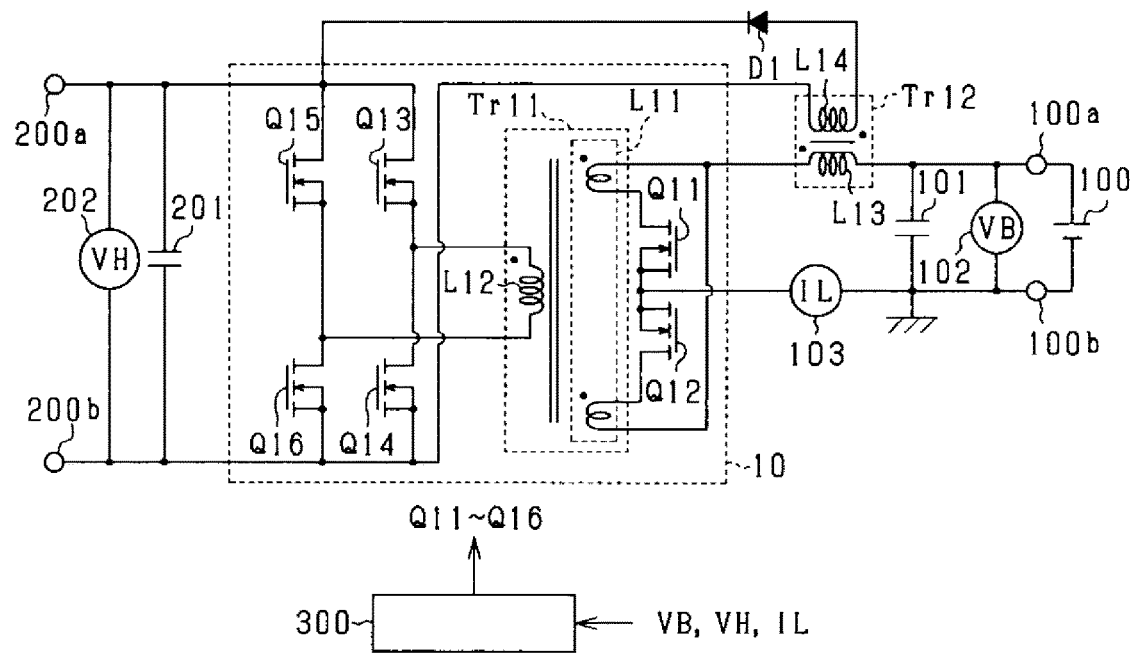
FIG. 1 is a view showing a schematic structure of an electric power conversion device according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a structure and behavior of an electric power conversion device according to a first exemplary embodiment with reference to FIG. 1 to FIG. 14.

FIG. 1 is a view showing a schematic structure of the electric power conversion device according to the first exemplary embodiment of the present invention.

As shown in FIG. 1, the electric power conversion device according to the first exemplary embodiment is mounted on a hybrid vehicle equipped with a rechargeable battery (or a secondary battery) such as a lead-acid battery providing 12 volts and a high voltage battery such as a lithium ion rechargeable battery providing several hundred volts.

The electric power conversion device shown in FIG. 1 supplies the electric power of a direct current rechargeable battery 100 (hereinafter, the DC rechargeable battery 100) to an output part of the electric power conversion device through a voltage conversion circuit 10. The DC rechargeable battery 100 is connected to an input part of the electric power conversion device.

The voltage conversion circuit 10 has a transformer Tr11 and a first switch Q11 to a sixth switch Q16. Each of the first switch Q11 to the sixth switch Q16 is made of a metal oxide field effect transistor (MOSFET). The transformer Tr11 has a primary coil L11 and a secondary coil L12. The primary coil L11 and the secondary coil L12 are magnetically connected together. The primary coil L11 has a center tap (CT). The number of turns of the secondary coil L12 is N/2 times of the number of turns of the primary coil L11, where N is a natural number. That is, the number of turns of the secondary coil L12 is N times of the number of turns from one end of the primary coil L11 to the center tap of the transformer Tr11. The center tap (CT) is a contact made to a point halfway along a winding of the transformer Tr11. Each of the first switch Q11 to the sixth switch Q16 has a body diode. The body diode in each of the first switch Q11 to the sixth switch Q16 is omitted from FIG. 1.

One end terminal of the primary coil L11 is connected to a drain terminal of the first switch Q11, and the other end terminal of the primary coil L11 is connected to a drain terminal of the second switch Q12. A source terminal of the first switch Q11 is connected to a source terminal of the second switch Q12.

The DC rechargeable battery 100 is connected to the electric power conversion circuit 10 through the choke coil L13. Specifically, a first end terminal of the choke coil L13 is connected to a positive electrode of the DC rechargeable battery 100 through a positive electrode side input terminal 100a arranged at the positive electrode side of the DC rechargeable battery 100.

A connection node between the source terminal of the first switch Q11 and a source terminal of the second switch Q12 is connected to a negative electrode of the DC rechargeable battery 100 through a negative electrode side input terminal 100b arranged at the negative electrode side of the DC rechargeable battery 100. An input-side capacitance 101 is connected parallel to the DC rechargeable battery 100. The input part of the electric power conversion circuit 10 corresponds to the positive electrode side input terminal 100a and the negative electrode side input terminal 100b.

The first end terminal of the secondary coil L12 is connected to the source terminal of the third switch Q13 and the drain terminal of the fourth switch Q14. The second end terminal of the secondary coil L12 is connected to the source terminal of the fifth switch Q15 and the drain terminal of the sixth switch Q16.

The drain terminal of the third switch Q13 and the drain terminal of the fifth switch Q15 are connected to a positive electrode side output terminal 200a. The source terminal of the fourth switch Q14 and the source terminal of the sixth switch Q16 are connected to a negative electrode side output terminal 200b.

The positive electrode side output terminal 200a is connected to the negative electrode side output terminal 200b through an output-side capacitor 201.

The output part of the electric power conversion circuit 10 corresponds to the positive electrode side output terminal 200a and the negative electrode side output terminal 200b.

The electric power conversion device according to the first exemplary embodiment further has an auxiliary coil L14 which is magnetically connected to the choke coil L13. The choke coil L13 and the auxiliary coil L14 form a secondary transformer Tr12. The secondary transformer Tr12 acts as a fly back transformer.

The auxiliary coil L14 is wound parallel to the electric power conversion circuit 10 and connected to the positive electrode side output terminal 200a and the negative electrode side output terminal 200b.

The auxiliary coil L14 is wound so as to supply a current from the negative electrode side output terminal 200b to the positive electrode side output terminal 200a through the auxiliary coil L14 when the current flows from the DC rechargeable battery 100 to the choke coil L13. Specifically, the auxiliary coil L14 is wound so that the end terminal of the auxiliary coil L14 arranged at the negative electrode side output terminal 200b becomes a positive polarity when a positive polarity voltage is supplied to the end terminal of the choke coil L13 arranged at the positive-electrode side input terminal 100a. The number of turns of the choke coil L13 is N times of the number of turns of the auxiliary coil L14. That is, the turn number ratio of the auxiliary coil L14 and the choke coil L13 is N:1, where N is a natural number.

The end terminal of the auxiliary coil L14 arranged at the positive electrode side output terminal 200a is connected to an anode terminal of a diode D1. A cathode terminal of the diode D1 is connected to the positive electrode side output terminal 200a.

When the voltage is supplied from the positive electrode of the DC rechargeable battery 100 to the choke coil L13, the diode dD1 prohibits the supply of electric power to the output part through the auxiliary coil L14. Further, when the voltage is supplied from the positive electrode side output terminal 200a to the auxiliary coil L14, the diode D1 prohibits the supply of electric power to the choke coil L13.

It is acceptable for the electric power conversion device according to the first exemplary embodiment to have another structure in which the diode D1 is connected to the end terminal of the auxiliary coil L14 arranged at the negative electrode side output terminal 200b, and the cathode terminal of the diode D1 is connected to the auxiliary coil L14.

The electric power conversion device according to the first exemplary embodiment shown in FIG. 1 further has an input-side voltage detection part 102, an input-side current detection part 103, an output-side voltage detection part 202, and a control part 300.

The input-side voltage detection part 102 detects a voltage of the input-side capacitor 101 as the input-side voltage VB. The input-side current detection part 103 detects a current flowing in the choke coil L13 as a reactor current IL. The output-side voltage detection part 202 detects a voltage of the output-side capacitor 201 as the output-side voltage VH.

The input-side voltage detection part 102 transmits the detected input-side voltage VB to the control part 300. The input-side current detection part 103 transmits the detected reactor current IL to the control part 300. Further, the output-side voltage detection part 202 transmits the detected output-side voltage VH to the control part 300.

When receiving detection signals which represent the input-side voltage VB, the reactor current IL and the output-side voltage VH, respectively, the control part 300 generates control signals on the basis of the received input-side voltage VB, the received reactor current IL and the received output-side voltage VH, and transmits the control signals to the first switch Q11 and the second switch Q12. In this case, the control part 300 selects one of a first mode control process, a second mode control process and a third mode control process according to a ratio of charge of the output-side capacitor 201. That is, the control part 300 performs one of the first mode control process, the second mode control process and the third mode control process.

For example, it is possible to use a computer system to realize the functions provided by the control part 300. That is, the computer system is configured to provide the functions of the control part 300. The computer system has a central processing unit (CPU), a memory unit, etc. Programs corresponding to the functions of the control part 300 have been stored in the memory unit such as a read only memory (ROM), a random access memory (RAM), etc. in the computer system. It is also possible to use a non-transitory computer readable storage medium instead of using the memory unit in the computer system for storing such programs. The programs are capable of causing the CPU in the computer system to execute the functions of the control part 300.

Figure 2:
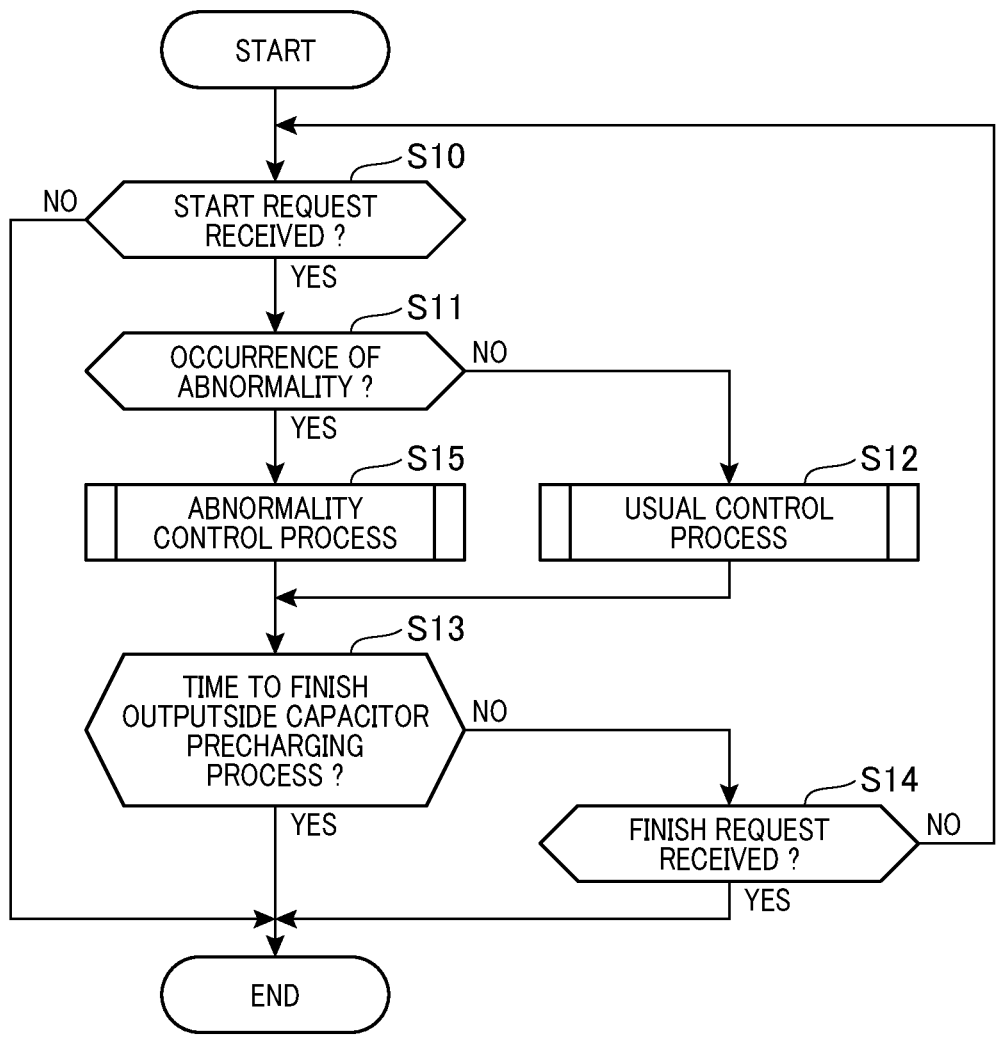
FIG. 2 is a flow chart showing an output-side capacitor pre-charging process performed by a control part in the electric power conversion device according to the first exemplary embodiment shown in FIG. 1.

FIG. 2 is a flow chart showing an output-side capacitor pre-charging process performed by the control part 300 in the electric power conversion device according to the first exemplary embodiment shown in FIG. 1. For example, the control part 300 repeatedly performs the output-side capacitor pre-charging process shown in FIG. 2 every predetermined period.

In the output-side capacitor pre-charging process shown in FIG. 2, the control part 300 detects whether receiving a start request for starting the execution of the output-side capacitor pre-charging process in step S10. For example, an upper-side control unit (not shown) transmits the start request to the control part 300.

When the detection result in step S10 indicates negative ("NO" in step S10), i.e. indicates that the control part 300 has not receive any start request, the control part 300 does not perform any step and waits until the reception of the start request.

On the other hand, when the detection result in step S10 indicates positive ("YES" in step S10), i.e. indicates that the control part 300 has received the start request, the operation flow progresses to step S11.

In step S11, the control part 300 detects has not detected any abnormality in at least one of the input-side voltage detection part 102 and the output-side voltage detection part 202.

For example, the abnormality of the input-side voltage detection part 102 indicates that the detection value of the input-side voltage detection part 102 is significantly different from a terminal voltage of the input-side capacitance 101. For example, the abnormality of the input-side voltage detection part 102 occurs when a failure occurs in the input-side voltage detection part 102 or noise is superimposed on the detection value of the input-side voltage detection part 102.

The abnormality of the output-side voltage detection part 202 indicates that the detection value of the output-side voltage detection part 202 is significantly different from a terminal voltage of the output-side voltage detection part 202. For example, the abnormality of the output-side voltage detection part 202 occurs when a failure occurs in the output-side voltage detection part 202 or noise is superimposed on the detection value of the output-side voltage detection part 202.

When the detection result in step S11 indicates negative ("NO" in step S11), i.e. indicates that the control part 300 detects no abnormality occurs in at least one of the input-side voltage detection part 102 and the output-side voltage detection part 202. The operation flow progresses to step S12.

In step S12, the control part 300 performs the usual control process.

Figure 3:
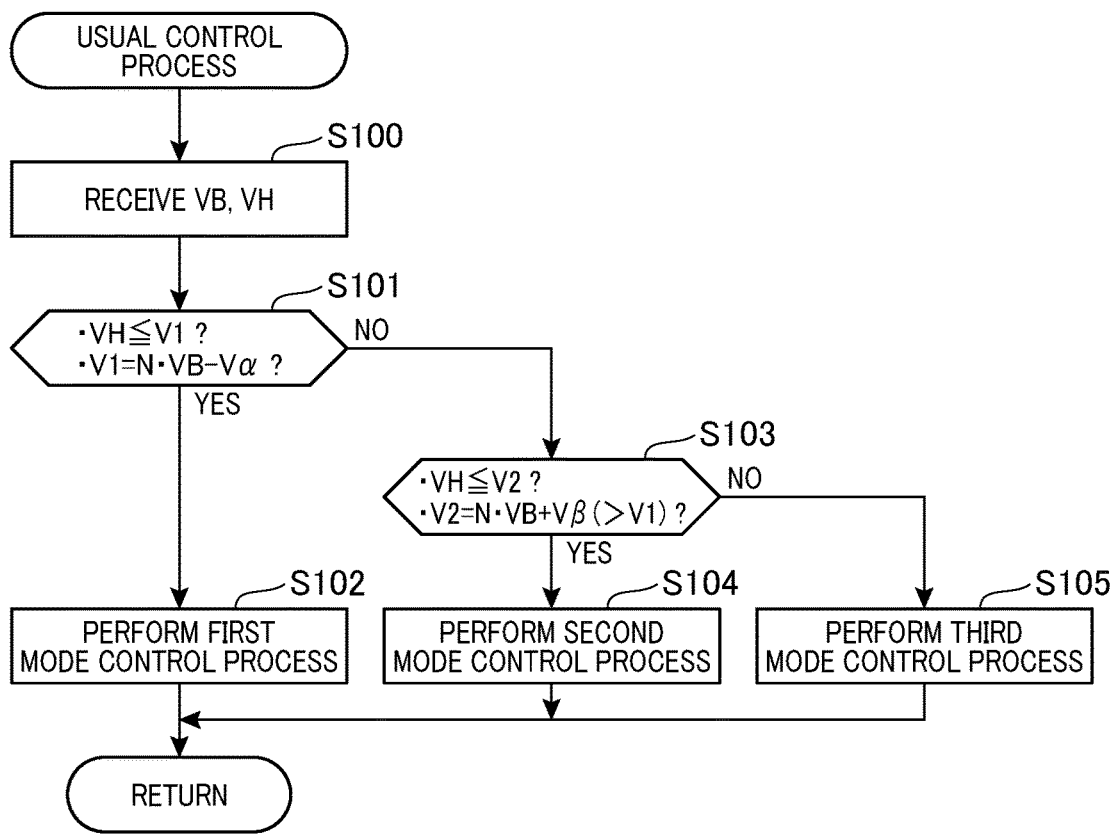
FIG. 3 is a flow chart showing a usual control process performed by the control part in the electric power conversion device according to the first exemplary embodiment shown in FIG. 1.

FIG. 3 is a flow chart showing the usual control process performed by the control part 300 in the electric power conversion device according to the first exemplary embodiment shown in FIG. 1.

In step S100 in the usual control process shown in FIG. 3, the control part 300 receives the detection signal representing the input-side voltage VB detected by and transmitted from the input-side voltage detection part 102, and receives the detection signal representing the output-side voltage VH detected by and transmitted from the output-side voltage detection part 202. The operation flow progresses to step S101.

In step S101, the control part 300 detects whether the output-side voltage VH is not more than a first threshold voltage V1. The first threshold voltage V1 has been determined on the basis of the input-side voltage VB. That is, the first threshold voltage V1 is calculated by using the following formula.

$V1 = N \times VB - V\alpha$, where $\alpha$ is a first predetermined value of a positive number, and N represents a relationship in number of turns between the secondary coil L2 and the primary coil L11.

When the detection result in step S101 indicates positive ("YES" in step S101), i.e. indicates that the output-side voltage VH is not more than the first threshold voltage V1, the operation flow progresses to step S102.

In step S102, the control part 300 performs the first mode control process.

A description will now be given of the first mode control process with reference to FIG. 1.

Figure 4:
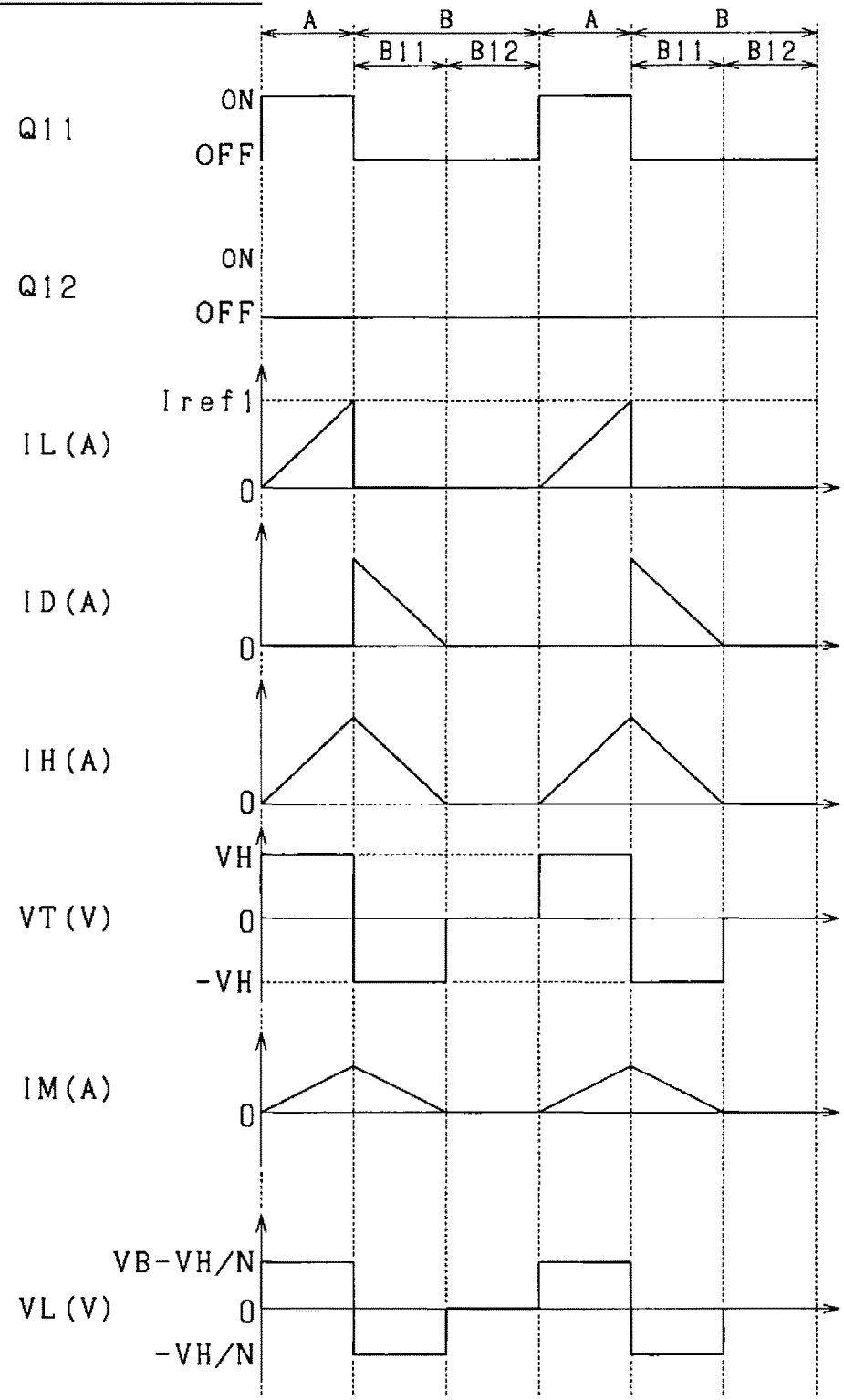
FIG. 4 is a timing chart showing a first mode control process performed by the control part in the electric power conversion device according to the first exemplary embodiment shown in FIG. 1.

FIG. 4 is a timing chart showing the first mode control process performed by the control part 300 in the electric power conversion device according to the first exemplary embodiment shown in FIG. 1. That is, FIG. 4 shows the transition of the operation state of the first switch Q11 and the operation state of the second switch Q12, the transition of the reactor current IL, the transition of the fly back current ID which flows in the auxiliary coil L14 from the negative electrode side output terminal 200b to the positive electrode side output terminal 200a. FIG. 4 further shows the transition of the output-side current IH which flows from the secondary coil L12 to the output part, the transition of the excitation voltage VT which is a voltage applied to the secondary coil L12, the transition of the excitation current IM which flows in the transformer Tr11, and the transition of the reactor voltage VL which is a voltage applied to the choke coil L13. A time change amount of the excitation current IM is calculated by dividing the excitation voltage VT with an excitation inductance.

In the mode control process, the control part 300 performs A mode and B mode alternately. In the A mode, the first switch Q11 is turned on and the second switch Q12 is turned off. On the other hand, in the B mode, the first switch Q11 is turned off and the second switch Q12 is also turned off.

That is, in the A mode and the B mode in the first mode control process, the control part 300 turns off the second switch Q12, i.e. the second switch Q12 is always turned off, and the control part 300 alternately turns on and off the first switch Q11. In more detail, in the A mode, because the reactor current IL is monotonically increased, the control part 300 performs the B mode when the reactor current IL becomes a first predetermined instruction value Iref1.

During the B mode in the first mode control process, the reactor current IL becomes zero. Further, a counter electromotive force is generated in the choke coil L13, the reactor voltage VL becomes a negative value which is obtained by dividing the output-side voltage VH with the turn number ratio. Accordingly, the fly back current ID is monotonically reduced on the basis of the reactor voltage VL, and the reactor current IL is linearly and monotonically reduced. Further, the excitation voltage VT becomes equal to a negative value of the output-side voltage VH, and the excitation current IM is monotonically reduced. During a B11 mode which is the first half of the B mode, the fly back current ID flows. During a B12 mode which is the second half of the B mode, no fly back current flows.

In step S101 shown in FIG. 3, when the control part 300 detects that the output-side voltage VH is higher than the first threshold voltage V1, the operation flow progresses to step S103, the control part 300 detects whether the output-side voltage VH is higher than a second threshold voltage V2. The control part 300 determines the second threshold voltage V2 on the basis of the received input-side voltage VB so that the second threshold voltage V2 is higher than the first threshold voltage V1. That is, the control part 300 determines the detected input-side voltage VB by using the following equation:

$V2 = N \times VB + V\beta$, where N is the turn number ratio of the secondary coil L12 and the primary coil L11, and $V\beta$ is a second predetermined value of a positive integer.

In step S103, when the control part 300 detects that the output-side voltage VH is not more than the second threshold voltage V2, the operation flow progresses to step S104.

In step S104, the control part 300 performs the second mode control process.

A description will now be given of the explanation of the second mode with reference to FIG. 5.

Figure 5:
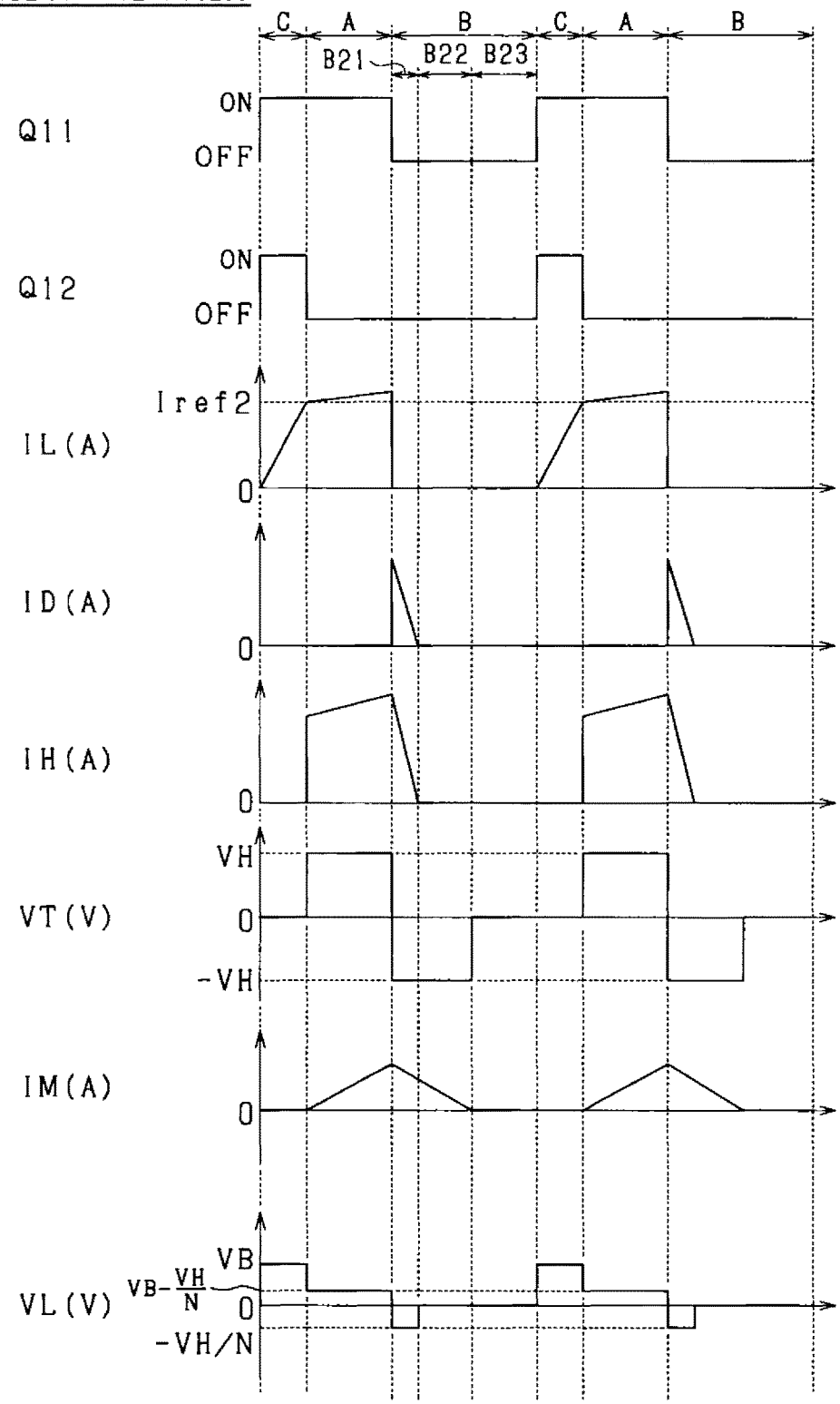
FIG. 5 is a timing chart showing a second mode control process performed by the control part in the electric power conversion device according to the first exemplary embodiment shown in FIG. 1.

FIG. 5 is a timing chart showing the second mode control process performed by the control part 300 in the electric power conversion device according to the first exemplary embodiment shown in FIG. 1.

In the second mode control process, the control part 300 sequentially performs a C mode, the A mode and the B mode. During the C mode, the control part 300 turns off both the switch Q11 and the switch Q12. During the C mode, because the reactor current IL is monotonically increased, the control part 300 switches from the C mode to the A mode so that the reactor current IL becomes a second instruction value Iref2.

It is sufficient for the control part 300 to switch from the A mode to the C mode when a predetermined period of time is elapsed counted from the start timing of the C mode or the A mode.

As previously explained with reference to FIG. 5, the reactor current IL is monotonically increased in the A mode. However, there is a possible case in which the reactor current IL is not changed, i.e. does not increase and reduce or is monotonically reduced due to the input-side voltage VB and the output-side voltage VH.

The fly back current flows in a B21 mode as the first half in the B mode. No fly back current ID flows in a B22 mode and a B23 mode as the second half in the B mode.

In step S103 shown in FIG. 3, when the control part 300 detects that the output-side voltage VH is higher than the second threshold voltage V2, the operation flow progresses to step S105. In step S105, the control part 300 performs the third mode control process.

A description will now be given of the explanation of the third mode with reference to FIG. 6.

Figure 6:
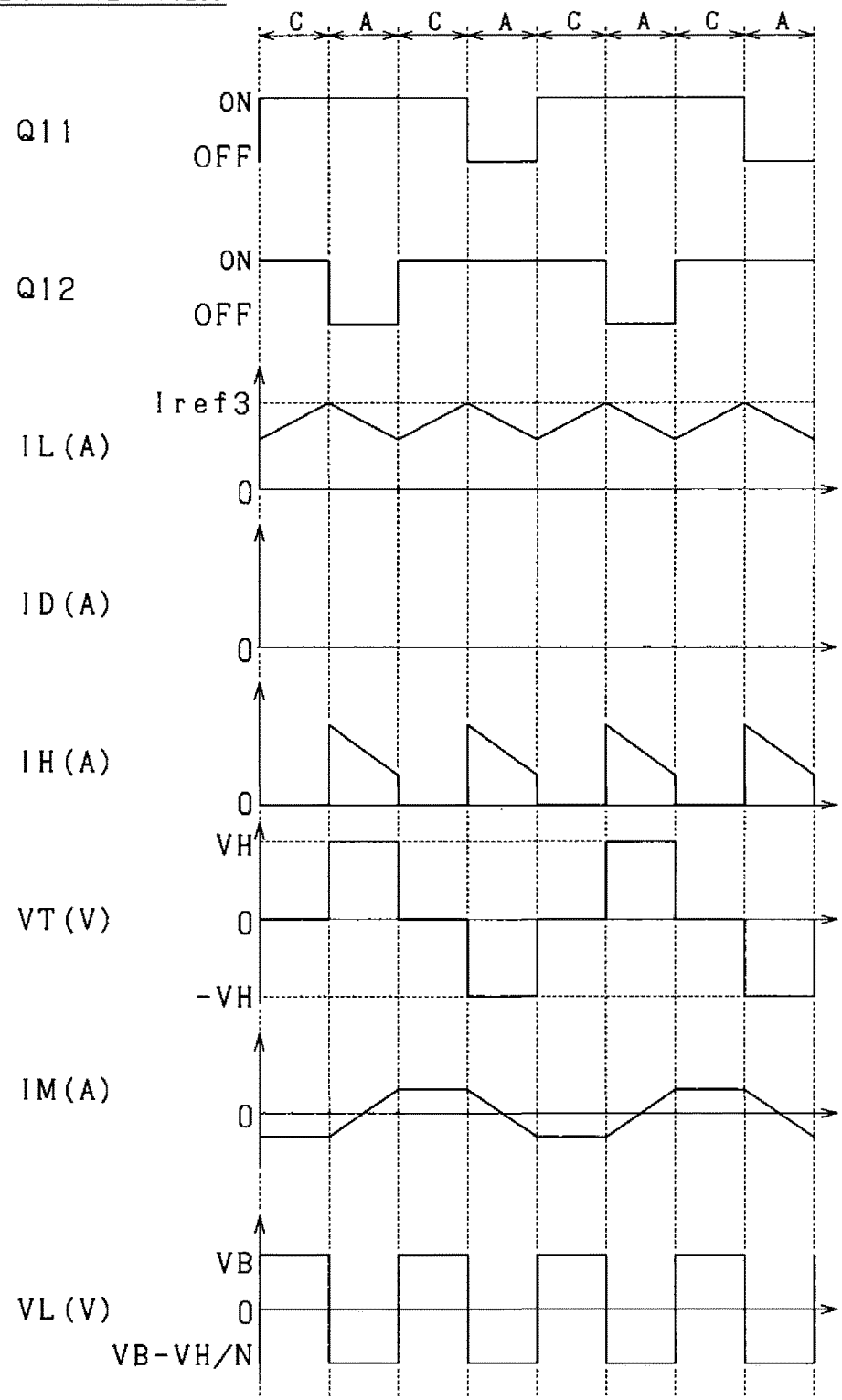
FIG. 6 is a timing chart showing a third mode control process performed by the control part in the electric power conversion device according to the first exemplary embodiment shown in FIG. 1.

FIG. 6 is a timing chart showing the third mode control process performed by the control part 300 in the electric power conversion device according to the first exemplary embodiment shown in FIG. 1.

In the third mode control process, the control part 300 performs the mode C and the A mode alternately. As previously explained, during the A mode, one of the first switch Q11 and the second switch Q12 is turned on and the other is turned off.

In the mode C in the third mode control process, because the reactor current IL is linearly and monotonically increased, the control part 300 switches from the mode C to the A mode when the reactor current IL becomes a third predetermined instruction value Iref3.

After the step S12 shown in FIG. 2, the operation flow progresses to step S13.

In step S13, the control part 300 detects whether it is possible to finish the output-side capacitor pre-charging process shown in FIG. 2. Specifically, the control part 300 receives the output-side voltage VH again, and detects whether the received output-side voltage VH is not less than a predetermined upper limit value Vth (for example, 230V). When the detection result indicates positive ("YES" in step S13), i.e. indicates that the received output-side voltage VH is not less than a predetermined upper limit value Vth, the control part 300 finishes the output-side capacitor pre-charging process shown in FIG. 2. After this, the control part 300 waits to receive the next start request.

When the detection result in step S13 indicates negative ("NO" in step S13), i.e. indicates that the received output-side voltage VH is not less than a predetermined upper limit value Vth, the operation flow progresses to step S14.

In step S14, the control part 300 detects whether has received the finish request transmitted from the upper side control unit (not shown).

When the detection result in step S14 indicates positive ("YES" in step S14), i.e. indicates that the control part 300 has received the finish request, the control part 300 finishes the output-side capacitor pre-charging process. The control part 300 waits to receiving the next start request.

On the other hand, when the detection result in step S14 indicates negative ("NO" in step S14), i.e. indicates that the control part 300 does not receive the finish request, the control part 300 returns to step S10, and performs the processes in step S10 to step S14.

FIG. 2 shows the output-side capacitor pre-charging process only for charging the output-side capacitor 201. The electric power conversion device according to the first exemplary embodiment further performs the electric power conversion of the DC electric power and supplies the converted electric power to the output-side capacitor 201. For example, the electric power supplied through the positive electrode side output terminal 200a and the negative electrode side output terminal 200b is reduced, and the DC rechargeable battery 100 is charged by the reduced electric power. Because this charging control process is known, the explanation of the charging control process is omitted here.

When the control part 300 detects that abnormality occurs in at least one of the input-side voltage detection part 102 and the output-side voltage detection part 202, the operation flow progresses to step S15.

Figure 7:
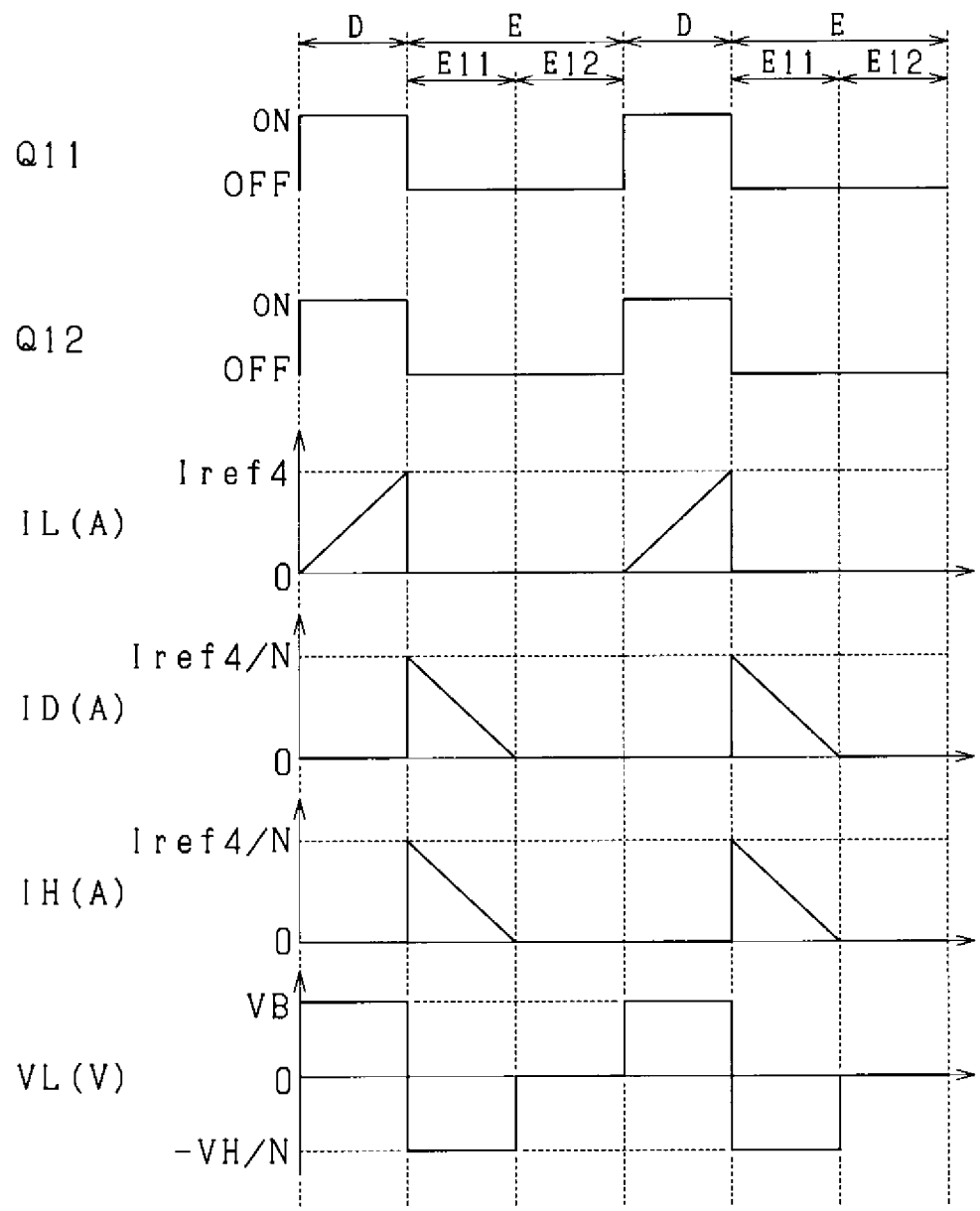
FIG. 7 is a timing chart showing an abnormality control process performed by the control part in the electric power conversion device according to the first exemplary embodiment shown in FIG. 1.

In step S15, the control part 300 performs the abnormality control process shown in FIG. 7.

A description will be given of the abnormality control process with reference to FIG. 7.

FIG. 7 is a timing chart showing the abnormality control process performed by the control part 300 in the electric power conversion device according to the first exemplary embodiment shown in FIG. 1.

In the abnormality control process, the control part 300 performs a D mode and an E mode alternately. In the D mode, the control part 300 turns on both the first switch Q11 and the second switch Q12. In the E mode, the control part 300 turns off both the first switch Q11 and the second switch Q12. The D mode corresponds to the turned ON control, and the E mode corresponds to the turned OFF control.

Figure 8:
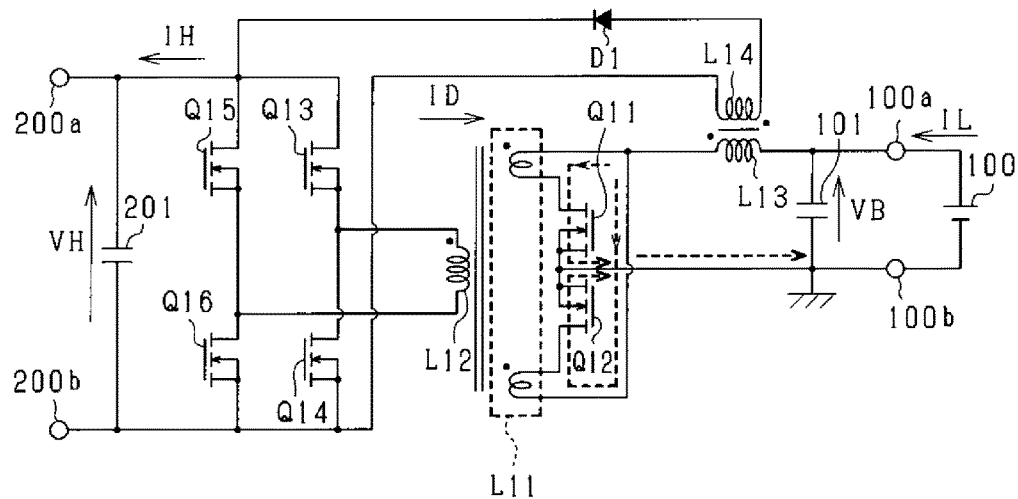
FIG. 8 is a view showing a current path under a D mode performed by the control part in the electric power conversion device according to the first exemplary embodiment shown in FIG. 1.

FIG. 8 is a view showing a current path under the D mode performed by the control part 300 in the electric power conversion device according to the first exemplary embodiment shown in FIG. 1.

In the D mode shown in FIG. 8, the current flows in a first current path and a second current path. In the first current path, the current flows from the positive electrode of the DC rechargeable battery 100 to the negative electrode of the DC rechargeable battery 100 through the choke coil L13, the primary coil L11 and the first switch Q11. In the second current path, the current flows from the positive electrode of the DC rechargeable battery 100 to the negative electrode of the DC rechargeable battery 100 through the choke coil L13, the primary coil L11 and the secondary coil L12.

In the D mode shown in FIG. 7, the reactor current IL becomes equal to the input-side voltage VB, and no output-side current IH flows. Further, in the D mode, the reactor current IL is monotonically increased, and the control part 300 performs the E mode as the turned off control in order to reduce the reactor current IL when the reactor current IL becomes equal to a fourth instruction value Iref4. That is, in the D mode, the control part 300 performs a peak current control process so as to feedback the reactor current IL.

Figure 9:
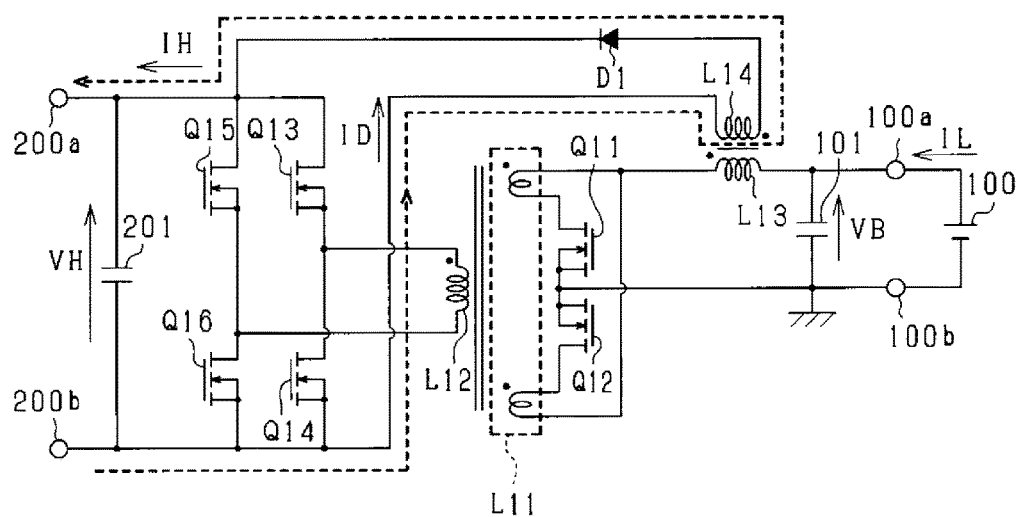
FIG. 9 is a view showing a current path under a E11 mode performed by the control part in the electric power conversion device according to the first exemplary embodiment shown in FIG. 1.

FIG. 9 is a view showing a current path under the E11 mode performed by the control part 300 in the electric power conversion device according to the first exemplary embodiment shown in FIG. 1.

In the E11 mode as the first half of the E mode shown in FIG. 9, the current flows from the negative electrode side output terminal 200b to the positive electrode side output terminal 200a through the auxiliary coil L14 and the diode D1.

In the E11 mode as the first half of the E mode shown in FIG. 7, the reactor voltage VL becomes a value of −VH/N, and the fly back current ID is monotonically reduced. Accordingly, the output-side current IH flows in the E11 mode. As shown in FIG. 7, the E12 mode is the second half in the E mode. For example, it is acceptable for an absolute value obtained by multiplying the reactor voltage VL in the D mode with the continuous period of the D mode to be equal to an absolute value obtained by multiplying the reactor voltage VL in the E11 mode with the continuous period of the E11 mode.

When the detection result in step S11 indicates negative ("NO" in step S11), the control part 300 performs the abnormality control process so as to suppress an excess current flows in the choke coil L13 due to incorrect excitation or incorrect demagnetization of the choke coil L13.

When abnormality occurs in at least one of the input-side voltage detection part 102 and the output-side voltage detection part 202, there is a possible case in which the control part 300 performs the third mode control process as the incorrect control process instead of performing the first mode control process as the correct control process. That is, because the output-side capacitor 201 is not sufficiently charged when the control part 300 performs the first mode control process, the terminal voltage of the output-side capacitor 201 becomes low. In this situation, the reactor voltage VL (=VB−VH/N) in the A mode in the third mode control process, and it is difficult to demagnetize the choke coil L13 in the A mode in the third mode control process.

As a result, there is a possible case in which an excess current flows in the choke coil L13, the first switch Q11 and the second switch Q12.

Further, there is a possible case in which the control part 300 performs the first control process as the incorrect control process instead of performing the third mode control process as the correct control process. Because the charging of the output-side capacitor 201 has fully progressed when the control part 300 performs the third mode control process, the terminal voltage of the output-side capacitor 201 becomes high. In this situation, the reactor voltage VL (=VB−VH/N) in the A mode in the first mode control process becomes a negative value, and it becomes difficult to excite the choke coil L13 in the A mode in the first mode control process. As a result, there is a possible case in which no current flows in the choke coil L13.

As previously described, the incorrect state occurs due to the magnitude of the terminal voltage of the input-side capacitor 101 and the magnitude of the terminal voltage of the output-side capacitor 202.

On the other hand, because the electric power conversion device according to the first exemplary embodiment performs the abnormality control process regardless of the magnitude of the terminal voltage of the input-side capacitor 101 and the terminal voltage of the output-side capacitor 202, the electric power conversion device according to the first exemplary embodiment makes it possible to correctly perform the excitation and the demagnetization of the choke coil L13. That is, as shown in FIG. 7, the voltage to be used for exciting the choke coil L13 is determined on the basis of the terminal voltage of the input-side capacitor 101 during the D mode, and the voltage to be used for demagnetizing the choke coil L13 is determined on the basis of the terminal voltage of the output-side capacitor 202 during the E11 mode. In the abnormality control process performed by the electric power conversion device according to the first exemplary embodiment, because the first switch Q11 and the second switch Q12 are turned on and off synchronized with each other, this makes it possible to eliminate the internal magnetic flux generated in the transformer Tr11, and to generate no magnetic flux in the primary coil L11. That is, this improved structure makes it possible to disable the transformer Tr11 from doing the function of a forward transformer, and possible to use the secondary transformer Tr12 as the fly back transformer. As a result, the electric power conversion device according to the first exemplary embodiment shown in FIG. 1 can act as a fly back converter. Even if abnormality occurs in at least one of the input-side voltage detection part 102 and the output-side voltage detection part 202, it is possible to increase the robustness function and to effectively suppress an excess current from flowing in the choke coil L13, the first switch Q11 and the second switch Q12.

Figure 10:
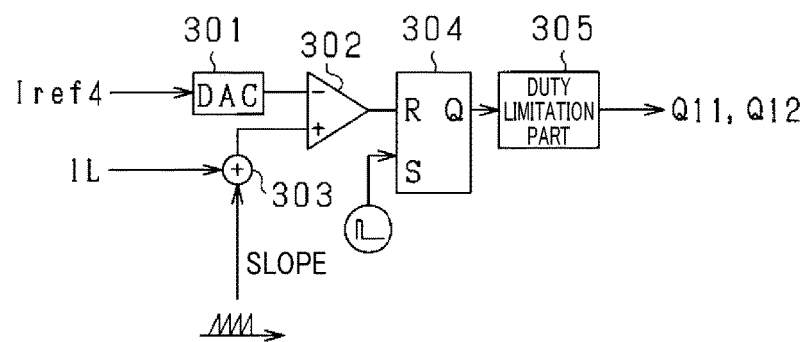
FIG. 10 is a block diagram showing a peak current mode control process performed by the control part in the electric power conversion device according to the first exemplary embodiment shown in FIG. 1.

FIG. 10 is a block diagram showing a peak current mode control process performed by the control part 300 in the electric power conversion device according to the first exemplary embodiment shown in FIG. 1.

A digital to analogue converter 301 (hereinafter, the DA converter 301) shown in FIG. 10 converts the fourth instruction value Iref 4 in a digital form to the fourth instruction value Iref 4 in an analogue form. The DA converter 301 transmits the converted fourth instruction value Iref 4 to an inverting input terminal of a comparator 302.

An adder 303 adds the detected reactor current IL and a slope compensation signal slope having a saw tooth waveform, and transmits the addition result to a non-inverting input terminal of the comparator 302. The slope compensation signal Slope suppresses oscillation due to variation of the current flowing in the choke coil L13.

The comparator 302 compares the fourth instruction value Iref4 received through the inverting input terminal with the output value of the adder 303 received through the non-inverting input terminal. The comparator 302 transmits a logical low-level signal as the comparison result to a R terminal of a RS flip flop circuit 304 during a period when the received output value is smaller than the received fourth instruction value Iref4. The comparator 302 transmits a logical high-level signal as the comparison result to the R terminal of the RS flip flop circuit 304 during a period when the received output value is greater than the received fourth instruction value Iref4. A S terminal of the RS flip flop circuit 304 receives a clock signal. A duty limitation part 305 determines a limit value of the duty ratio, and generates control signals of the first switch Q11 and the second switch Q12 on the basis of the output signal of the RS flip flop circuit 304. As shown in FIG. 7, the control part 300 performs the switch control operation of the first switch Q11 and the second switch Q12 on the basis of the control signals transmitted from the duty limitation part 305.

Figure 11:
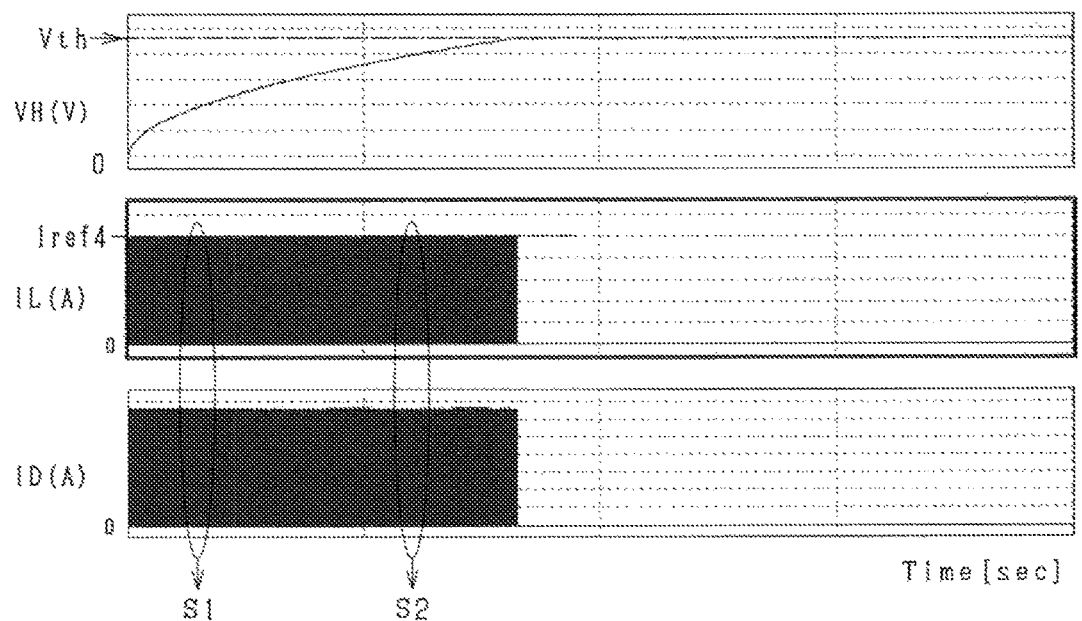
FIG. 11 is a timing chart showing the output-side capacitor pre-charging process under the abnormality control process performed by the control part in the electric power conversion device according to the first exemplary embodiment shown in FIG. 1.

FIG. 11 is a timing chart showing the output-side capacitor pre-charging process under the abnormality control process performed by the control part 300 in the electric power conversion device according to the first exemplary embodiment shown in FIG. 1.

Figure 12:
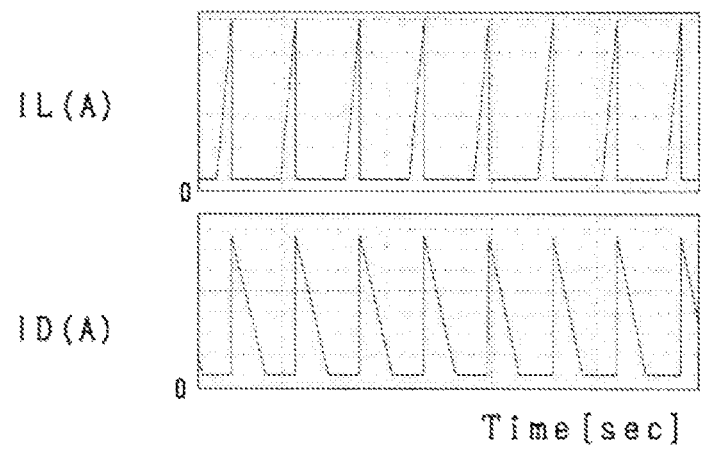
FIG. 12 is a timing chart showing an expansion of the S1 period in the area S1 in the timing chart shown in FIG. 11.
Figure 13:
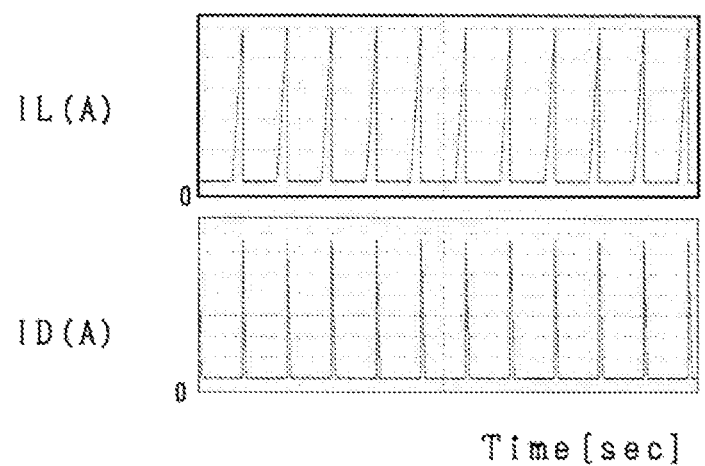
FIG. 13 is a timing chart showing an expansion of the S2 period in the area S1 in the timing chart shown in FIG. 11.

In more detail, FIG. 11 shows the transition of the output-side voltage VH, the reactor current IL and the fly back current IF when the output-side capacitor 201 is charged under the abnormality control process. FIG. 12 is a timing chart showing an expansion of the S1 period in the timing chart shown in FIG. 11. FIG. 13 is a timing chart showing an expansion of the S2 period in the timing chart shown in FIG. 11.

When the electric power conversion device according to the first exemplary embodiment performs the abnormality control process, it is not necessary to switch the switch control mode according to the magnitude of each of the output-side voltage VH and the input-side voltage VB. This structure makes it possible to increase the robustness function when abnormality occurs in at least one of the input-side voltage detection part 102 and the output-side voltage detection part 202. Further, because of not being necessary to switch the switch control according to the magnitude of each of the output-side voltage VH and the input-side voltage VB, it is possible to reduce the amount of information of the software programs when the function of the control part 300 is realized by using the software programs.

Figure 14:
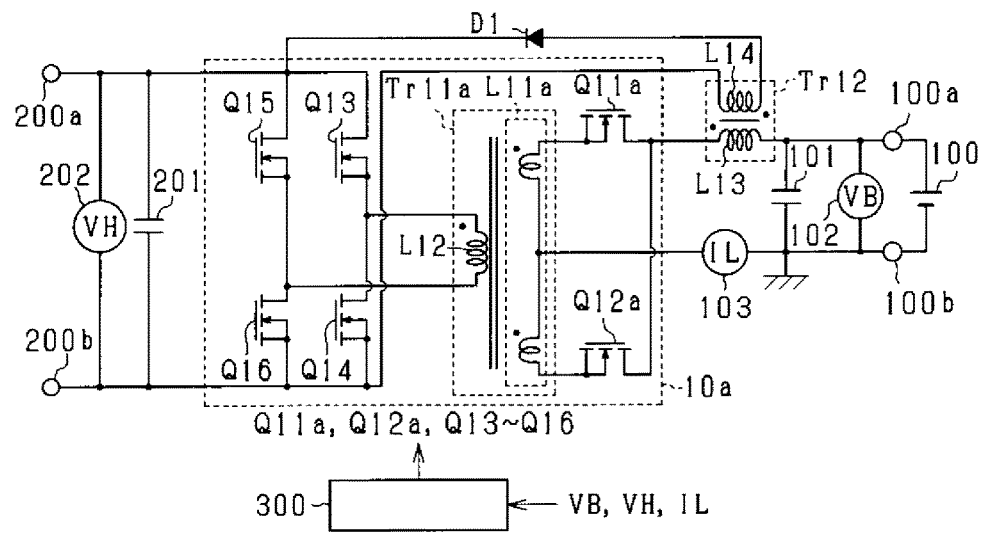
FIG. 14 is a view showing a modification of the structure of the electric power conversion device according to the first exemplary embodiment of the present invention.

Modification of the Electric Power Conversion Device According to the First Exemplary Embodiment FIG. 14 is a view showing a modification of the structure of the electric power conversion device according to the first exemplary embodiment of the present invention.

It is possible for the electric power conversion device to have a modified structure 10a shown in FIG. 14. The same components between the modification and the first exemplary embodiment will be referred with the same reference numbers and characters. The explanation of the same components is omitted here for brevity.

In the modified structure 10a of the electric power conversion device shown in FIG. 14, the source of the first switch Q11a and the source terminal of the second switch Q12a are connected respectively to both end terminals of the primary coil L11a forming the transformer 11a. The first switch Q11a shown in FIG. 14 corresponds to the first switch Q11 shown in FIG. 1. The second switch Q12a shown in FIG. 14 corresponds to the second switch Q12 shown in FIG. 1.

The drain terminal of the first switch Q11a is connected to the drain terminal of the second switch Q12a. The connection node between the first switch Q11a and the second switch Q12a is connected to the second terminal of the choke coil L13. The center tap of the primary coil L11 is connected to the negative electrode of the DC rechargeable battery 100 through the negative electrode side input terminal 100b thereof. It is acceptable to connect the diode D1 to the negative electrode side output terminal 200b of the auxiliary coil L14.

The modified structure of the electric power conversion device shown in FIG. 14 provides the same effects as the electric power conversion device according to the first exemplary embodiment shown in FIG. 1.

Second Exemplary Embodiment

A description will be given of the electric power conversion device according to the second exemplary embodiment with reference to FIG. 15 and FIG. 16.

Figure 15:
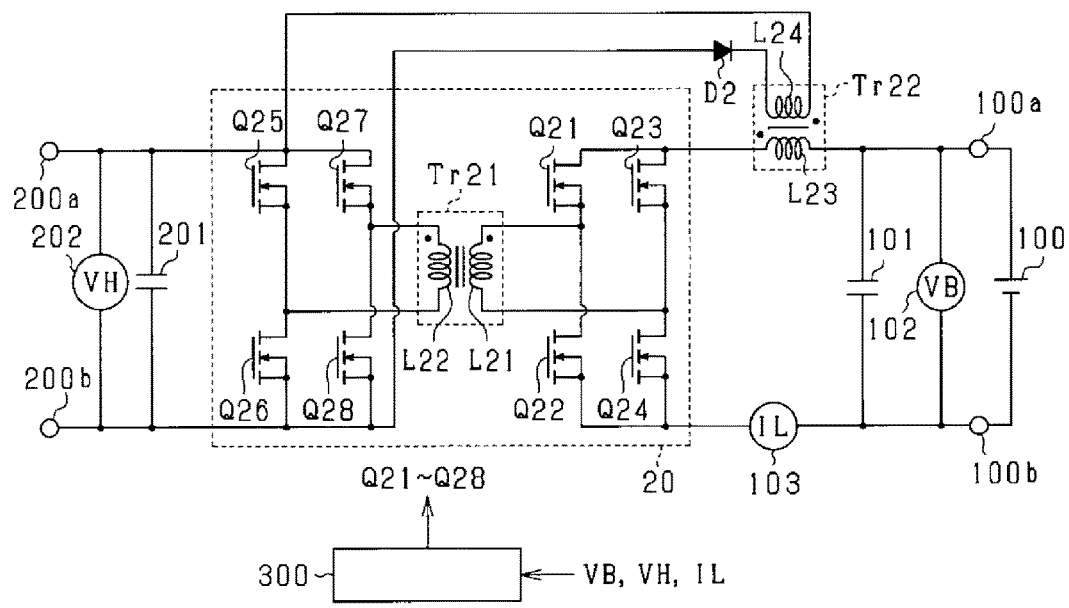
FIG. 15 is a view showing a schematic structure of the electric power conversion device according to a second exemplary embodiment of the present invention.

FIG. 15 is a view showing a schematic structure of the electric power conversion device according to the second exemplary embodiment of the present invention. The same components between the second exemplary embodiment and the first exemplary embodiment will be referred with the same reference numbers and characters. The explanation of the same components is omitted here for brevity.

As shown in FIG. 15, the electric power conversion circuit 20 in the electric power conversion circuit 20 has a transformer Tr21 and a first switch Q21 to an eighth switch Q28. Each of the first switch Q21 to the eighth switch Q28 is made of a metal oxide field effect transistor (MOSFET). The transformer Tr21 has a primary coil L21 and a secondary coil L22. The primary coil L21 and the secondary coil L22 are magnetically connected together. The ratio in number of turns between the primary coil L21 and the secondary coil L22 is 1:N, where N is a natural number. Each of the first switch Q21 to the eighth switch Q28 has a body diode. Each of the first switch Q21 to the eighth switch Q28 has a body diode. The body diode is reversely connected to each of the first switch Q21 to the eighth switch Q28. These body diodes are omitted from FIG. 15.

The source of the first switch Q21 is connected to the drain of the second switch Q22. The connection node between the source of the first switch Q21 and the drain of the second switch Q22 is connected to one end terminal of the primary coil L21 in the transformer Tr21.

The source of the third switch Q23 is connected to the drain of the fourth switch Q24. The connection node between the source of the third switch Q23 and the drain of the fourth switch Q24 is connected to the other end terminal of the primary coil L21 in the transformer Tr21.

The drain of the first switch Q21 and the drain of the third switch Q23 are connected to one end terminal of the choke coil L23. The other end terminal of the choke coil L23 is connected to the positive electrode of the DC rechargeable battery 100 through the positive electrode side input terminal 100a.

The source of the second switch Q22 and the source of the fourth switch Q24 are connected to the negative electrode of the DC rechargeable battery 100 through the negative electrode side input terminal 100b. The fifth switch Q25 to the eighth switch Q28 have the same behavior and effects of the third switch Q13 to the sixth switch Q16. Accordingly, the explanation of the fifth switch Q25 to the eighth switch Q28 is omitted here for brevity.

An auxiliary coil L24 is arranged so as to magnetically connect with the choke coil L23. That is, the choke coil L23 and the auxiliary coil L24 form the second transformer Tr22.

Each of the choke coil L23 and the auxiliary coil L24 in the second transformer Tr22 shown in FIG. 15 has the same winding structure of the choke coil L23 and the auxiliary coil L24 shown in FIG. 1. That is, the first exemplary embodiment and the second exemplary embodiment have the same winding structure of each of the choke coil L23 and the auxiliary coil L24. The diode D2 in the electric power conversion device according to the second exemplary embodiment shown in FIG. 15 is arranged similar to the arrangement of the diode D1 in the electric power conversion device according to the first exemplary embodiment shown in FIG. 1. Accordingly, the explanation of each of the choke coil L23, the auxiliary coil L24 and the diode D2 is omitted here for brevity. It is acceptable to arrange the diode D2 to be connected to the end terminal of the auxiliary coil L24 at the positive electrode side output terminal 200a side.

The control part 300 selects one of the first mode control process, the second mode control process and the third mode control process according to the ratio of charge of the output-side capacitor 201. Because the behavior of each of the first mode control process, the second mode control process and the third mode control process has been explained in the first exemplary embodiment in detail, the explanation of each of the first mode control process, the second mode control process and the third mode control process is omitted here for brevity.

A description will now be given of the abnormality control process performed by the control part 300 with reference to FIG. 16.

Figure 16:
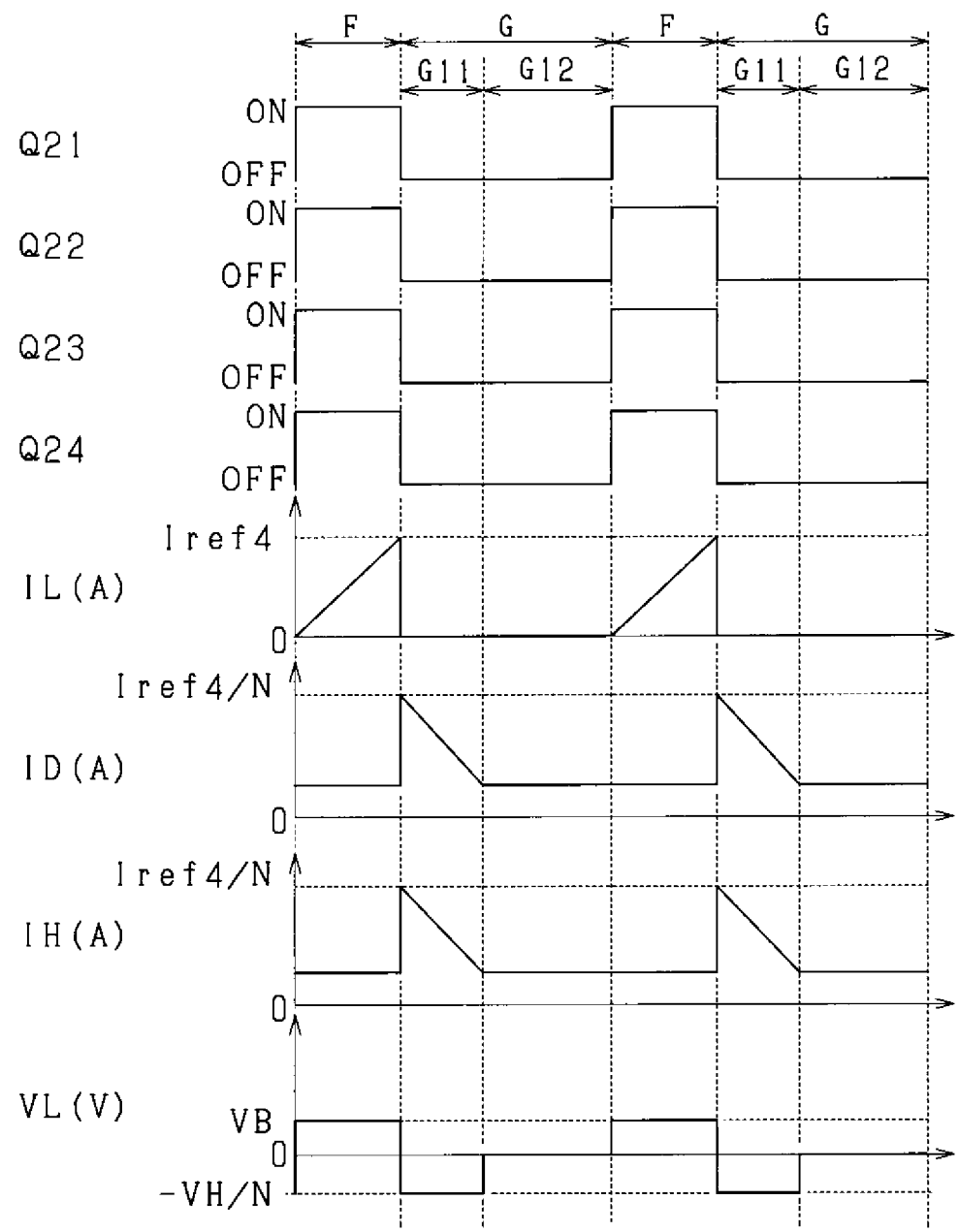
FIG. 16 is a timing chart showing an abnormality control process performed by the control part in the electric power conversion device according to the second exemplary embodiment shown in FIG. 15.

FIG. 16 is a timing chart showing the abnormality control process performed by the control part 300 in the electric power conversion device according to the second exemplary embodiment shown in FIG. 15.

In the abnormality control process, the control part 300 performs a F mode and a G mode alternately. In the F mode, the control part 300 turns on all of the first switch Q21 to the fourth switch Q24 simultaneously. In the G mode, the control part 300 turns off all of the first switch Q21 to the fourth switch Q24 simultaneously. The F mode corresponds to the turned ON control, and the G mode corresponds to the turned OFF control.

In the F mode, the reactor voltage VL becomes equal to the input-side voltage VB, and no output-side current IH flows. Further, in the F mode, the reactor current IL is monotonically increased. The control part 300 performs the G mode as the turned-off control in order to reduce the reactor current IL when the reactor current IL becomes equal to the fourth instruction value Iref4.

In the G11 mode as the first half of the G mode shown in FIG. 16, the reactor voltage VL becomes a value of −VH/N, and the fly back current ID is monotonically reduced. For this reason, the output-side current IH flows in the G mode.

Figure 17:
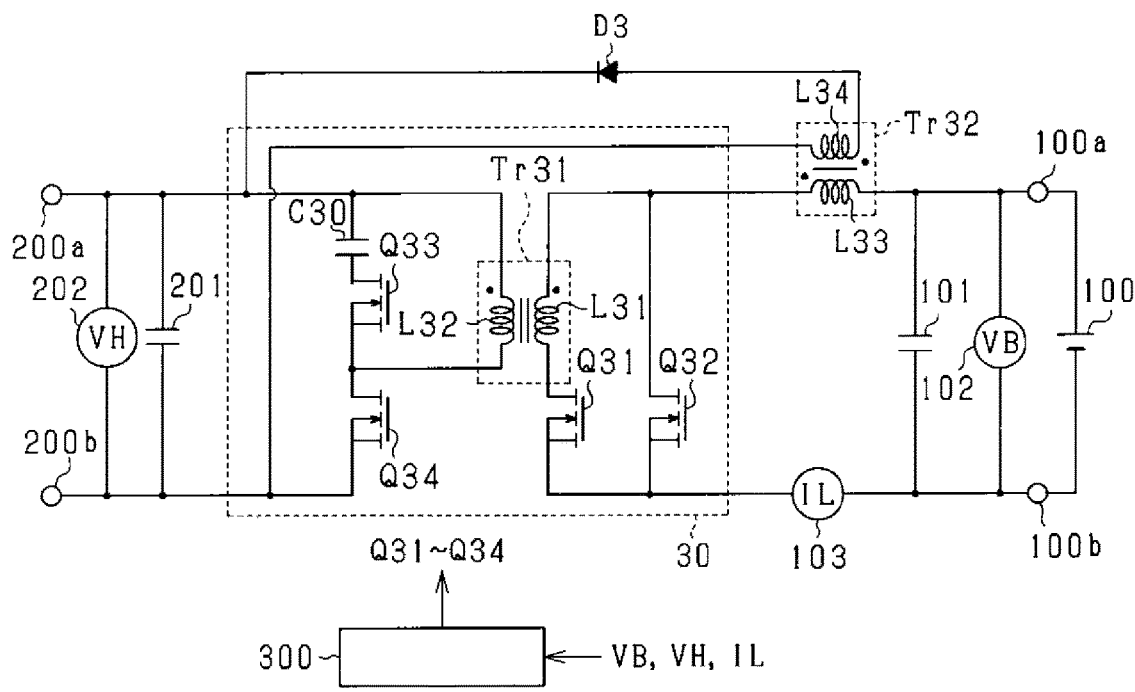
FIG. 17 is a view showing a schematic structure of the electric power conversion device according to a third exemplary embodiment of the present invention.

In the E11 mode as the first half of the E mode shown in FIG. 7, the reactor voltage VL becomes a value of −VH/N, and the fly back current ID is monotonically reduced. Accordingly, the output-side current IH flows during the G11 mode. As shown in FIG. 17, the G12 mode is the second half in the G mode. For example, it is acceptable for an absolute value obtained by multiplying the reactor voltage VL in the F mode with the continuous period of the F mode to be equal to an absolute value obtained by multiplying the reactor voltage VL in the G11 mode with the continuous period of the G11 mode.

It is possible for the electric power conversion device according to the second exemplary embodiment to have the same effects as the electric power conversion device according to the first exemplary embodiment.

Third Exemplary Embodiment

A description will be given of the electric power conversion device according to the third exemplary embodiment with reference to FIG. 17 and FIG. 18.

FIG. 17 is a view showing a schematic structure of the electric power conversion device according to the third exemplary embodiment of the present invention. The same components between the third exemplary embodiment and the first exemplary embodiment will be referred with the same reference numbers and characters. The explanation of the same components is omitted here for brevity. The difference between the third exemplary embodiment and the first exemplary embodiment will be explained.

The electric power conversion circuit 30 in the electric power conversion device according to the third exemplary embodiment has a transformer Tr31, a first switch Q31 to a fourth switch Q34 and a capacitor C30. Each of the first switch Q31 to the fourth switch Q34 is made of a metal oxide field effect transistor (MOSFET). The transformer Tr31 has a primary coil L31 and a secondary coil L32. The primary coil L31 and the secondary coil L32 are magnetically connected together. Specifically, each of the first switch Q31 to the fourth switch Q34 has a body diode. The body diode is reversely connected to each of the first switch Q31 to the fourth switch Q34. These body diodes are omitted from FIG. 17.

The primary coil L31 arranged at the input side of the transformer Tr31 is connected in series with the first switch Q31. The primary coil L31 and the first switch Q31 form a series connection body. This series connection body is connected parallel to the second switch Q32. Specifically, one end terminal of the primary coil L31 is connected to the drain of the second switch Q32, and the other end terminal of the primary coil L31 is connected to the drain of the first switch Q31. The source of the first switch Q31 is connected to the source of the second switch Q32.

A connection node between the drain of the first switch Q31 and the primary coil L31 is connected to the positive electrode of the DC rechargeable battery 100 through the choke coil L33 and the positive electrode-side input terminal 100a. A connection node between the source of the first switch Q31 and the source of the second switch Q32 is connected to the negative electrode of the DC rechargeable battery 100 through the negative electrode-side input terminal 100b.

The secondary coil L32 is arranged at the output side of the transformer Tr31, and magnetically connected with the primary coil L31. The turn ratio between the primary coil L31 and the secondary coil L32 is 1:N, where N is a natural number.

The third switch Q33 and the capacitor C30 are connected in series. The third switch Q33 and the capacitor C30 form a series connection body. The series connection body is connected parallel with the secondary coil L32 to form a parallel connection body. The parallel connection body is connected in series with the fourth switch Q34. Specifically, one end terminal of the secondary coil L32 is connected to one end terminal of the capacitor C30. The other terminal of the capacitor C30 is connected to the drain of the third switch Q33. The other end terminal of the secondary coil L32 is connected to the source of the third switch Q33. The connection node between the secondary coil L32 and the source of the third switch Q33 is connected to the drain of the fourth switch Q34. The connection node between the secondary coil L32 and the capacitor C30 is connected to the positive electrode-side output terminal 200a. The source of the fourth switch Q34 is connected to the negative electrode side output terminal 200b.

The choke coil L33 is magnetically connected with the auxiliary coil L34. The choke coil L33 and the auxiliary coil L34 form the secondary transformer Tr32. The choke coil L33 and the auxiliary coil L34 are wound like the choke coil L13 and the auxiliary coil L14 previously explained in the first exemplary embodiment. The diode D3 is arranged like the diode D1 previously explained in the first exemplary embodiment. Accordingly, the explanation of each of the choke coil L33, the auxiliary coil L34 and the diode D3 is omitted here for brevity. It is acceptable to arrange the diode D3 to be connected to the end terminal of the auxiliary coil L34 at the negative electrode-side output terminal 200b side.

The control part 300 performs one of the first mode control process, the second mode control process and the third mode control process according to the ratio of charge of the output-side capacitor 201. The explanation of the behavior of each of the first mode control process, the second mode control process and the third mode control process is omitted here.

A description will now be given of the abnormality control process performed by the control part 300 in the electric power conversion device according to the third exemplary embodiment with reference to FIG. 18.

Figure 18:
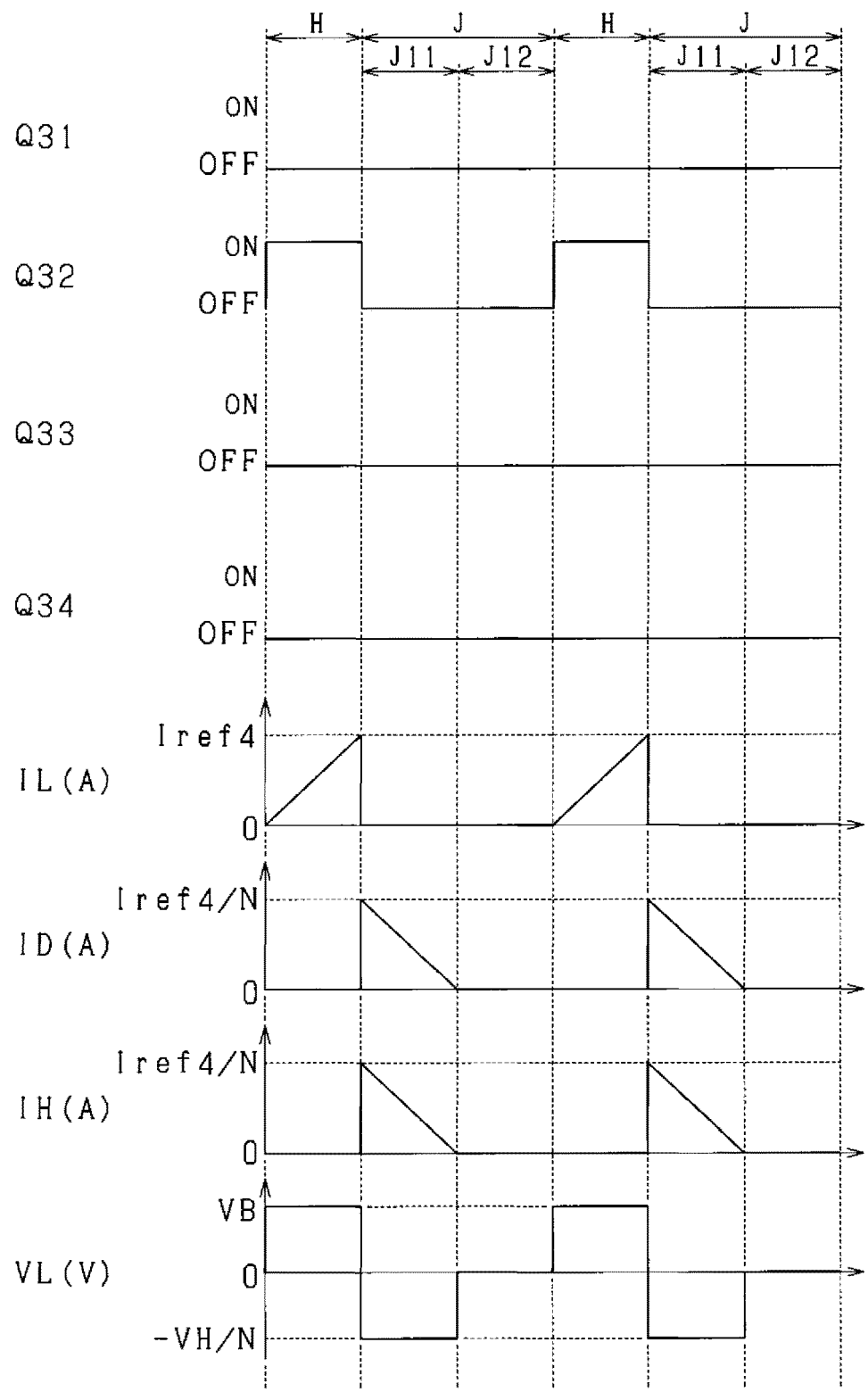
FIG. 18 is a timing chart showing the abnormality control process performed by the control part in the electric power conversion device according to the third exemplary embodiment shown in FIG. 17.

FIG. 18 is a timing chart showing the abnormality control process performed by the control part 300 in the electric power conversion device according to the third exemplary embodiment shown in FIG. 17.

In the abnormality control process, the control part 300 performs an H mode and a J mode alternately.

In the H mode, the control part 300 turns on the second switch Q32, and turns off the first switch Q31, the third switch Q33 and the fourth switch Q34. In the J mode, the control part 300 turns off all of the first switch Q31 to the fourth switch Q34 simultaneously. The H mode corresponds to the turned ON control, and the J mode corresponds to the turned OFF control.

In the H mode, the reactor voltage VL becomes equal to the input-side voltage VB, and no output-side current IH flows. Further, in the H mode, the reactor current IL is monotonically increased. The control part 300 performs the J mode as the turned-off control when the reactor current IL becomes equal to the fourth instruction value Iref4.

In the J11 mode as the first half of the J mode shown in FIG. 18, the reactor voltage VL becomes a value of −VH/N, and the fly back current ID is monotonically reduced. For this reason, the output-side current IH flows in the J11 mode. As shown in FIG. 18, the 112 mode is the second half in the J mode.

In the H mode and the J mode shown in FIG. 18, no magnetic flux is generated in the primary coil L31. For example, it is acceptable for absolute value obtained by multiplying the reactor voltage VL in the H mode with the continuous period of the H mode to be equal to an absolute value obtained by multiplying the reactor voltage VL in the J11 mode with the continuous period of the J11 mode.

It is possible for the electric power conversion device according to the third exemplary embodiment to have the same effects as the electric power conversion device according to the first exemplary embodiment.

Figure 19:
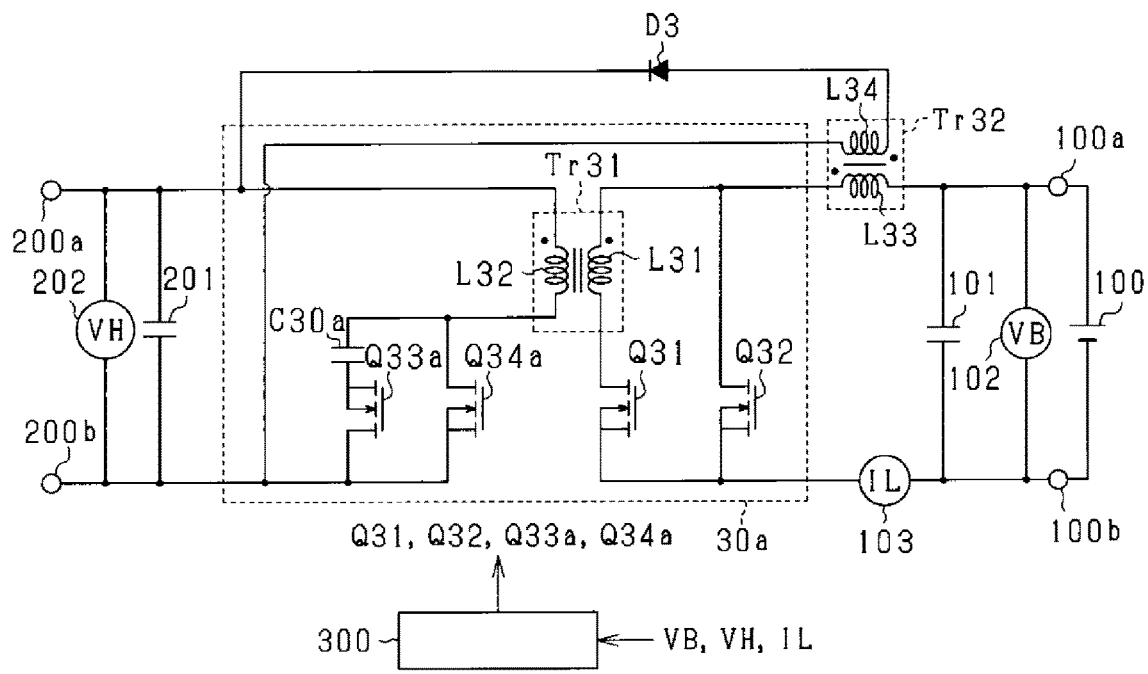
FIG. 19 is a view showing a modification of the structure of the electric power conversion device according to the third exemplary embodiment of the present invention.

Modifications of the Electric Power Conversion Device According to the Third Exemplary Embodiment It is possible for the electric power conversion device to have a modified structure shown in FIG. 19. That is, FIG. 19 is a view showing a modified structure of the electric power conversion circuit of the electric power conversion device according to the third exemplary embodiment of the present invention. That is, as shown in FIG. 19, it is acceptable for the electric power conversion device to have the electric power conversion circuit 30a. The same components between the modification of the third exemplary embodiment and the first exemplary embodiment will be referred with the same reference numbers and characters. The explanation of the same components is omitted here for brevity.

One end terminal of the secondary coil L32 which forms the output side of the transformer Tr31 is connected to the positive electrode side output terminal 200a. The other end terminal of the secondary coil L32 is connected to the drain of the fourth switch Q34a. A connection node between the secondary coil L32 and the drain of the fourth switch Q34a is connected to the source of the third switch Q33a through the capacitor C30a. The source of the fourth switch Q34a is connected to the drain of the third switch Q33a. A connection node between the fourth switch Q34a and the third switch Q33a is connected to the negative electrode side output terminal 200b. Specifically, each of the third switch Q32a and the fourth switch Q34a has a body diode. The body diode is reversely connected to each of the third switch Q33a and the fourth switch Q34a. These body diodes are omitted from FIG. 17.

It is possible for the electric power conversion device having the modified electric power conversion circuit shown in FIG. 19 to have the same effects as the electric power conversion device according to the first exemplary embodiment.

The concept of the present invention is not limited by the first to third exemplary embodiments and the modifications thereof. For example, it is acceptable for the control part 300 to perform the process for detecting whether abnormality occurs in the input-side voltage detection part 102, or the process for detecting whether abnormality occurs in the output-side voltage detection part 202, instead of performing the process in step S11 shown in FIG. 2.

In the process shown in FIG. 3, the control part 300 selects one of the three mode processes on the basis of the magnitude of the output side voltage VH. However, the concept of the present invention is not limited by this. For example, it is acceptable for the control part 300 to select two from the three mode processes on the basis of the magnitude of the output side voltage VH.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An electric power conversion device comprising:
    an input part, connected to a direct current power source, comprising a positive electrode side terminal and a negative electrode side terminal;
    a choke coil connected to the input part;
    an electric power conversion circuit, connected to the input part through the choke coil, equipped with a transformer and switches, the transformer comprising a primary coil and a secondary coil magnetically connected together;
    an output part, connected to the electric power conversion circuit, comprising a positive electrode side terminal and a negative electrode side terminal;
    an auxiliary coil, connected to the output part and magnetically connected to the choke coil, wound in order to allow a current to flow from the negative electrode side terminal of the output part choke coil to the positive electrode side terminal of the output part choke coil when a current flows from the direct current power source to the choke coil,
    a rectifier element, connected in series with the auxiliary coil, configured to prohibit supply of electric power from the direct current power source to the output part through the choke coil and the auxiliary coil, and to prohibit supply of electric power from the output part to the input part, when a closed circuit including the direct current power source and the choke coil by a switching control of the switches; and
    a control part configured to perform the switching control of the switches so as to prevent a magnetic flux from being generated in the primary coil, and to prohibit a current from flowing in the secondary coil, and to perform the supply of electric power from the direct current power source to the output part through the choke coil and the auxiliary coil, wherein:
    the primary coil of the transformer comprises a center tap, the switches comprises a first switch and a second switch, one of the positive electrode and the negative electrode of the direct current power source is connected to the first switch and the second switch and the other is connected to the center tap of the primary coil, and the switching control comprises a switch turned-on control and a switch turned-off control, and the control part performs the switch turned-on control and the switch turned-off control alternately, wherein the first switch and the second switch are turned on simultaneously in the switch turned-on control, and the first switch and the second switch are turned off simultaneously in the switch turned-off control.

2. The electric power conversion device according to claim 1, further comprising a current detection part configured to detect a current which flows in the choke coil, wherein the control part performs a peak current mode control in which the switch turned-on control is switched to the switch turned-off control when a current value detected by the current detection part reaches a predetermined value.

3. The electric power conversion device according to claim 1, further comprising a current detection part configured to detect a current which flows in the choke coil, wherein the control part performs a peak current mode control in which the switch turned-on control is switched to the switch turned-off control when a current value detected by the current detection part reaches a predetermined value.

4. An electric power conversion device comprising:

an input part, connected to a direct current power source, comprising a positive electrode side terminal and a negative electrode side terminal;

a choke coil connected to the input part;

an electric power conversion circuit, connected to the input part through the choke coil, equipped with a transformer and switches, the transformer comprising a primary coil and a secondary coil magnetically connected together;

an output part, connected to the electric power conversion circuit, comprising a positive electrode side terminal and a negative electrode side terminal;

an auxiliary coil, connected to the output part and magnetically connected to the choke coil, wound in order to allow a current to flow from the negative electrode side terminal of the output part choke coil to the positive electrode side terminal of the output part choke coil when a current flows from the direct current power source to the choke coil, a rectifier element, connected in series with the auxiliary coil, configured to prohibit supply of electric power from the direct current power source to the output part through the choke coil and the auxiliary coil, and to prohibit supply of electric power from the output part to the input part, when a closed circuit including the direct current power source and the choke coil by a switching control of the switches; and a control part configured to perform the switching control of the switches so as to prevent a magnetic flux from being generated in the primary coil, and to prohibit a current from flowing in the secondary coil, and to perform the supply of electric power from the direct current power source to the output part through the choke coil and the auxiliary coil wherein:

the switches comprises a first switch, a second switch, a third switch and a fourth switch, the first switch and the second switch are connected in series, and the third switch and the fourth switch are connected in series, one end terminal of the primary coil is connected to a connection node between the first switch and the second switch, and the other end terminal of the primary coil is connected to a connection node between the third switch and the fourth switch, the first switch and the third switch are connected to the positive electrode of the direct current power source, the second switch and the fourth switch are connected to the negative electrode of the direct current power source, and the control part performs the switch turned-on control and the switch turned-off control alternately, wherein the first switch, the second switch, the third switch and the fourth switch are turned on simultaneously in the switch turned-on control, and the first switch, the second switch, the third switch and the fourth switch are turned off simultaneously in the switch turned-off control.

5. The electric power conversion device according to claim 4, further comprising a current detection part configured to detect a current which flows in the choke coil, wherein the control part performs a peak current mode control in which the switch turned-on control is switched to the switch turned-off control when a current value detected by the current detection part reaches a predetermined value.

6. The electric power conversion device according to claim 4, further comprising an output side capacitor connected parallel to the output part, and a voltage detection part configured to detect a voltage of at least one of the input part and the output part, wherein the control part detects a ratio of charge of the capacitor on the basis of a detection value of the voltage detection part when abnormality does not occur in the voltage detection part, the control part performs the switching control of the switches on the basis of the detected ratio of charge of the capacitor, and the control part performs a specific switch control instead of the switching control when abnormality occurs in the voltage detection part.

7. An electric power conversion device comprising:

an input part, connected to a direct current power source, comprising a positive electrode side terminal and a negative electrode side terminal;

a choke coil connected to the input part;

an electric power conversion circuit, connected to the input part through the choke coil, equipped with a transformer and switches, the transformer comprising a primary coil and a secondary coil magnetically connected together;

an output part, connected to the electric power conversion circuit, comprising a positive electrode side terminal and a negative electrode side terminal;

an auxiliary coil, connected to the output part and magnetically connected to the choke coil, wound in order to allow a current to flow from the negative electrode side terminal of the output part choke coil to the positive electrode side terminal of the output part choke coil when a current flows from the direct current power source to the choke coil, a rectifier element, connected in series with the auxiliary coil, configured to prohibit supply of electric power from the direct current power source to the output part through the choke coil and the auxiliary coil, and to prohibit supply of electric power from the output part to the input part, when a closed circuit including the direct current power source and the choke coil by a switching control of the switches; and a control part configured to perform the switching control of the switches so as to prevent a magnetic flux from being generated in the primary coil, and to prohibit a current from flowing in the secondary coil, and to perform the supply of electric power from the direct current power source to the output part through the choke coil and the auxiliary coil, wherein:

the switches comprises a first switch, a second switch and a third switch, the first switch is connected in series to the primary coil, the second switch is connected parallel to a series connection body comprising the primary coil and the first switch, the third switch is connected parallel to the secondary coil or is connected in series to the secondary coil through a capacitor, and the control part performs a switch turned-on control and a switch turned-off control alternately, wherein only the first switch is turned on in the switch turned-on control and the first switch, the second switch and the third switch are turned off simultaneously in the switch turned-off control.

8. The electric power conversion device according to claim 7, further comprising a current detection part configured to detect a current which flows in the choke coil, wherein the control part performs a peak current mode control in which the switch turned-on control is switched to the switch turned-off control when a current value detected by the current detection part reaches a predetermined value.

9. The electric power conversion device according to claim 7, further comprising an output side capacitor connected parallel to the output part, and a voltage detection part configured to detect a voltage of at least one of the input part and the output part, wherein the control part detects a ratio of charge of the capacitor on the basis of a detection value of the voltage detection part when abnormality does not occur in the voltage detection part, the control part performs the switching control of the switches on the basis of the detected ratio of charge of the capacitor, and the control part performs a specific switch control instead of the switching control when abnormality occurs in the voltage detection part.

\* \* \* \* \*